United States Patent [19]

Bush et al.

[11] Patent Number: 4,917,911

[45] Date of Patent: Apr. 17, 1990

[54] BACON ASSEMBLY AND METHOD OF MAKING SAME

[75] Inventors: Robert G. Bush, Green Bay, Wis.; Ciro J. Giammona, Mercer Island, Wash.

[73] Assignee: Schreiber Foods, Inc., Green Bay, Wis.

[21] Appl. No.: 222,559

[22] Filed: Jul. 21, 1988

[51] Int. Cl.$^4$ .................................................. A23L 1/01
[52] U.S. Cl. ..................................... 426/243; 426/645
[58] Field of Search ................ 426/243, 241, 641, 645

[56] References Cited

U.S. PATENT DOCUMENTS 3,532,511 10/1970 Binkerd et al. ...................... 426/243

*Primary Examiner*—George Yeung
*Attorney, Agent, or Firm*—Willian Brinks Olds Hofer Gilson & Lione

[57] ABSTRACT

A bacon assembly and method of making same are disclosed in which a plurality of bacon strips are arranged on a single plane in a predetermined arrangement such that each of the bacon strips overlaps at least one other of the bacon strips at an overlapping section. The bacon strips in the arrangement are at least partially microwave cooked to form a microwave weld at the sections which overlap.

20 Claims, 1 Drawing Sheet

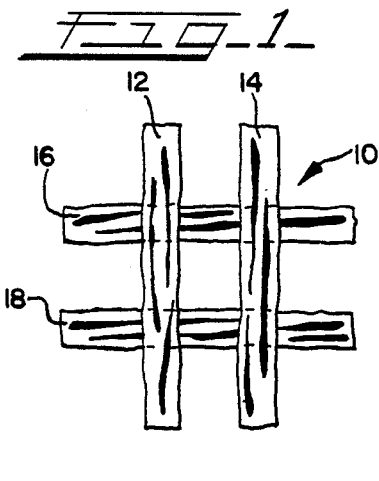
FIG_1_
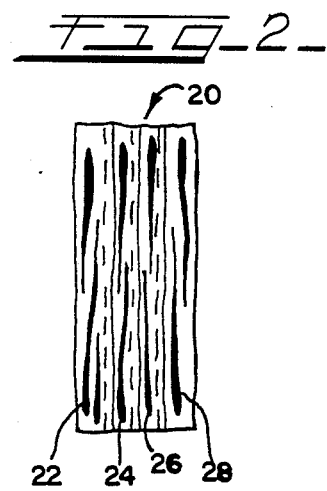
FIG_2_
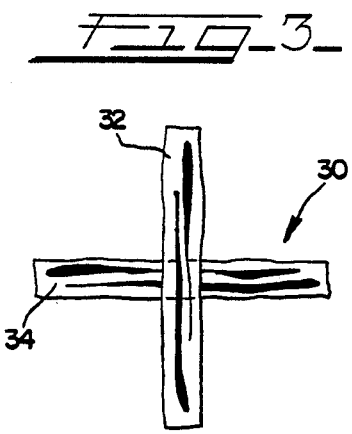
FIG_3_
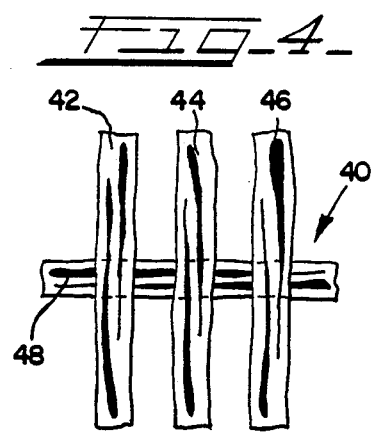
FIG_4_
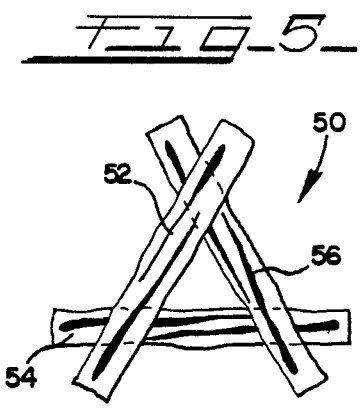
FIG_5_
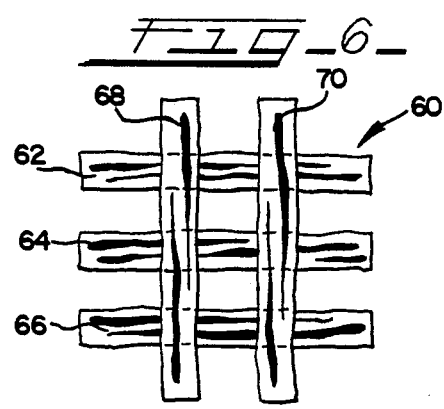
FIG_6_

BACON ASSEMBLY AND METHOD OF MAKING SAME

BACKGROUND OF INVENTION

This invention relates generally to a bacon assembly and more particularly to a bacon assembly made from a plurality of conventional slices or strips of bacon.

Changing tastes of consumers and marketing trends of restaurants, and particularly fast food restaurants have led to the increased use of bacon in prepared food products. For example, hamburgers which are marketed through fast food restaurants are often sold as "bacon burgers", wherein slices of bacon are served along with a hamburger. The popularity of "bacon burgers attest to the desirability of the combination which provides the consumer with a unique tasting hamburger. It has also become popular for restaurants to provide the consumer with the option of adding bacon to other sandwiches.

In addition to the unique taste provided by the bacon, the addition of the bacon to sandwiches provides the sellers with a powerful advertising and marketing tool for his products. Consumers prefer to be provided with a variety of options in their food selection. By selling and marketing a sandwich which includes a product as popular as bacon, the seller may have a significant advantage over other sellers who do not provide such an option.

Generally, these so called bacon burgers are made by simply placing two or three small slices of bacon on top of a hamburger patty, between the hamburger patty and the bun on which the hamburger is served. This arrangement, although simple to implement, has several disadvantages. First, it is desirable to present the consumer with a product with which the consumer feels that he/she will receive a bite of bacon in every bite of the hamburger (or other sandwich). By simply placing two or three small slices of bacon on top of the hamburger patty, only a portion of the hamburger patty will be covered by the bacon. In addition, since the bacon is provided in small separate slices, when the consumer bites into the hamburger he/she may remove the entire slice of bacon from the hamburger with a single bite. Second, since the bacon is served in small strips and is not bonded together in any particular fashion, the bacon strips may inadvertently fall to the side of the hamburger patty, thus leaving the consumer with an uncovered portion of the hamburger patty.

To this end some efforts have been devoted to developing a bacon patty which will cover the entire hamburger patty. For example a circular bacon patty has been developed which is adapted to cover the entire surface of a hamburger patty of a predetermined size. Although this presents the consumer with a bite of bacon in every bite of the hamburger, it is not without disadvantages. First, the process to make the hamburger patty is relatively expensive and time consuming. To manufacture such a bacon patty, a green pork belly is generally injected with a curing solution and then inserted into a massaging or tumbling machine to extract the protein from the belly. The extracted protein is sticky and thus functions as a glue-like material. Typically, the tumbled product is then inserted into a solenoidal casing (typically approximately seven inches in diameter and twenty-four inches long). The entire casing is subsequently inserted into an oven or smokehouse and heated to an internal predetermined temperature. This process causes the protein to bind thus producing a sausage-shaped product. After the entire product has been heated it is chilled to approximately 18° to 20° F. and the casing is then removed. The sausage-shaped product may then be sliced and packaged for distribution to restaurants. The restaurants may then use the slices by removing them from the package and cooking them.

As will be apparent to those skilled in the art, this process is a time consuming and relatively expensive process for the simple purpose for producing a patty-like bacon assembly.

An additional disadvantage to the bacon patty manufactured by this process is that when the bacon patty is incorporated into the finished product (i.e. the hamburger), the consumer may not always see the bacon, since the bun or other top bread covering will conceal the bacon patty. The consumer will typically have to remove the top portion of the bun to be assured that he has in fact received his chosen selection. Thus, although the consumer will likely get a bite of bacon with every bite of the hamburger, this arrangement is not particularly advantageous from a marketing view point. Consumers would prefer to readily see the bacon on the hamburger to be assured that they have received the correct product (a bacon burger for example). Further, since consumers are not accustomed to seeing round slices of bacon, they may perceive the round bacon patty as not being "real bacon".

Therefore, in view of the above, it is an object of the present invention to provide a bacon assembly which may be made from conventional slices of bacon.

It is a further object of the present invention to provide a bacon assembly which may be made from conventional slices of bacon which will cover a substantial portion of the surface area of a hamburger patty or other sandwich.

It is still a further object of the present invention to provide a bacon assembly which may be made from conventional slices of bacon which the consumer can readily visualize when it is placed in the finished product.

It is still a further object of the present invention to provide a method of making a bacon assembly from conventional slices of bacon in a relatively inexpensive matter.

SUMMARY OF THE INVENTION

To achieve the foregoing and other objects and in accordance with the purposes of the present invention, the bacon assembly of the present invention may comprise a plurality of bacon strips arranged on a single plane such that each of the bacon strips overlaps at least one of the other bacon strips at an overlapping section. The bacon strips are microwave welded to each other at the sections where they overlap, thus forming a bacon assembly in which all of the strips of bacon in the assembly are bonded together to form a single unit.

The invention also contemplates a method of making the bacon assembly which includes the steps of arranging a plurality of bacon strips on a single plane in a predetermined arrangement such that each of the bacon strips overlaps at least one of the other bacon strips at an overlapping section. The bacon assembly is then at least partially cooked by subjecting the bacon assembly to microwave radiation. In this manner, the bacon strips are welded together at the overlapping sections to form a single bacon assembly in which all of the individual bacon strips are bound together to form a single unit.

Therefore, the bacon assembly and method of making the bacon assembly of the present invention contemplates an arrangement in which a bacon assembly unit may be manufactured from conventional bacon strips in a relatively inexpensive manner. In preferred embodiments of the invention, the bacon strips may be arranged to cover the maximum surface area with the given number of bacon strips and may be readily seen by the consumer when placed on a sandwich.

Additional objects, advantages and novel features of the invention will be set forth in part in the description which follows, and in part will become apparent to those skilled in the art upon examination of the following or may be learned by practice of the invention. The objects and advantages of the invention may be obtained by means of the instrumentalities and combinations particularly pointed out in the appended claims.

BRIEF DESCRIPTION OF THE DRAWINGS

FIG. 1 illustrates a first preferred embodiment of the bacon assembly of the present invention wherein four strips of bacon are arranged in the form of a "number sign".

FIG. 2 illustrates a second preferred embodiment of the bacon assembly of the present invention which includes a plurality of bacon strips arranged in a shingled manner.

FIG. 3 illustrates a third preferred embodiment of the bacon assembly of the present invention wherein two strips of bacon are arranged orthoganal to each other.

FIG. 4 illustrates a fourth preferred embodiment of the bacon assembly of the present invention wherein in a plurality of strips are arranged in parallel with each other and a non-parallel strip of bacon overlaps each of the parallel strips.

FIG. 5 illustrates a fifth preferred embodiment of the bacon assembly of the present invention wherein three strips of bacon are arranged in a triangular shape.

FIG. 6 illustrates a sixth preferred embodiment of the bacon assembly of the present invention wherein three strips of bacon are arranged parallel to each other and two strips of bacon overlap the three parallel strips of bacon.

DETAILED DESCRIPTION OF THE PRESENTLY PREFERRED EMBODIMENTS

Referring now to the drawings. FIGS. 1-6 illustrate several preferred configurations for the bacon assembly of the present invention. The method of the present invention for forming the bacon assembly such that it comprises a single unit formed from the individual bacon strips is first described. The specific configurations of FIGS. 1-6 are described in more detail below.

It has been discovered that a bacon assembly can be made to form a single unit from individual strips of bacon bonded to each other at overlapping sections by the microwave techniques which are described below. To form the single unit bacon assembly, individual slices of bacon are first arranged in a predetermined configuration such that the slices overlap each other at a predetermined overlapping section. The bacon strips are preferably arranged such that the lean portion of one bacon strip engages the lean portion of another bacon strip at the overlapping section. After the bacon strips have been placed in the preferred arrangement, the bacon strips are then at least partially cooked in a microwave oven. The microwave radiation and the pressure at the overlapping sections, generated by the weight of the bacon strips, causes the protein in the bacon strips to bind at the overlapping sections. The individual strips of bacon are thus bonded at the overlapping sections. This technique is referred to here as "microwave welding" and the overlapping sections in which the microwave welding occurs are referred to as being "microwave welded". Preferably the microwave welding is accomplished by allowing the bacon strips to cook to a minimum internal temperature of 140° F. and then allowing the assembly to cool off.

As will be recognized by those skilled in the art, the bacon assembly may be either partially cooked or fully cooked as desired for the particular use. In an exemplary embodiment, the bacon strips are cooked to between 35% to 40% their green or original precooked weight.

In a preferred embodiment, the process of making the bacon assemblies includes using a slicer which will preferably slice a conventional slab of bacon in a horizontal manner and deposit the strip of bacon on a moving conveyor belt in a predetermined position. The conveyor belt moves the slice to a second location where a second slicer then arranges a second strip to overlap the first set of strips on the belt. The slicing and the movement as the conveyor belt are timed such that the slicers place the strips of bacon in the desired arrangement. As will be recognized by those skilled in the art, a plurality of slices may be arranged in a set position above the conveyor belt to form any desired arrangement. For example, to manufacture the bacon assembly 10 of FIG. 1, two slicers may be arranged parallel to each other at a first predetermined location. These two slicers will preferably place bacon strips 16 and 18 simultaneously on the conveyor belt. The belt will then move to a second predetermined location where a second pair of slicers will place bacon strips 12 and 14 to form the configuration of bacon assembly 10. In this manner, the operation of the slicers and conveyor belt may be timed such that each slicer places the respective slice of bacon on the conveyor belt with a great degree of accuracy. A suitable slicer is available from J. E. Grote Corp. of Blacklich, Ohio.

The conveyor belt then transports the uncooked arrangement into a commercial continuous microwave oven. The continuous microwave oven will preferably generate microwave radiation at approximately 150 to 200 kilowatts to precook the bacon to the desired temperature. A suitable microwave oven is available from Ratheon Corp.

As will be recognized by those skilled in the art, cooking the bacon strips to the desired temperature will be a function of several variables including the particular microwave energy of the microwave oven, the load on the belt, and the dwell time of the bacon assemblies in the microwave oven. These variables may be adjusted to precook the bacon assembly to the desired temperature, for example, to 40% of the green weight of the bacon, as discussed above.

As the bacon cooks in the microwave oven, the overlapping sections of the bacon are welded together by the protein in the bacon strips. Thus, a microwave welded unit is formed from the individual bacon strips, with the individual strips bonded together at the overlapping sections.

Referring now to the drawings, and specifically to FIG. 1, a preferred embodiment of a bacon assembly includes a first pair of bacon strips or slices 12 and 14 which are arranged substantially parallel to each other, and a second pair of bacon strips 16 and 18 which are arranged substantially parallel to each other and substantially orthoganal to the first pair of bacons strips 12 and 14. With such an arrangement, generally in the form of a "number sign" (#), a bacon in the bacon assembly 10 covers a substantial portion of the surface area of a hamburger patty.

Typically, the bacon strips may be 1"–1½" in width and approximately 4"–5" in length before they are precooked. In an exemplary embodiment, the parallel strips 12 and 14 are arranged such that the spacing between them is of from ¾"–1". The other pair of bacon strips 16 and 18 have the same dimensions and are arranged with the same spacing between the strips.

FIG. 2 shows another preferred embodiment of the present invention in which a plurality bacon strips 22, 24, 26 and 28 are arranged in a shingle type arrangement to form bacon assembly 20, wherein an edge of one of the bacon strips overlaps the edge of another strip. As will be recognized by those skilled in the art, the number of bacon strips used in this arrangement may be chosen to fit the particular use contemplated.

FIG. 3 illustrates another preferred embodiment to the present invention in which only two slices of bacon are used. The slices are disposed orthoganal to each other and preferably are arranged such that the overlapping section is centrally disposed. This arrangement may be particularly useful if a smaller number of bacon strips is desired. This configuration still provides an assembled configuration which will cover a substantial portion of a hamburger patty or other sandwich.

FIG. 4 illustrates another preferred embodiment of the present invention in which a plurality of bacon strips 44, 46 and 42 are arranged parallel to each other and a bacon strip 48 is arranged such that it overlaps each of the three substantially parallel bacons strips 42, 44 and 46. The strip 48 in this arrangement functions to bind the other three strips 42, 44 and 46 in an assembled unit 40.

FIG. 5 illustrates another preferred embodiment of the present invention in which three strips of bacon 52, 54 and 56 are disposed in a triangular arrangement to form an assembled bacon unit 50. This arrangement is particularly useful since it only includes three strips bacon yet covers a substantial portion of a hamburger patty.

FIG. 6 illustrates yet another preferred embodiment of the present invention which includes three substantially parallel bacon strips 62, 64 and 66 and two additional bacon strips 68 and 70 which are arranged substantially parallel to each other and substantially orthoganal to the three substantially parallel bacon strips 66, 64 and 62, to form an assembled unit 60. Since this arrangement provides an assembly which includes five strips of bacon, it may be particularly useful if the seller wishes to provide a large portion of bacon to the consumer.

With the bacon assembly of the present invention, the seller of hamburgers or other sandwich type food may easily place a bacon assembly on the top of the food being served. The consumer will readily view the bacon which will preferably protrude from the sides of the sandwich. Further, the consumer will readily see that the bacon assembly is formed from conventional bacon strips. The coverage of the bacon assembly will give the consumer the feel that he will receive a bite of bacon for every bite of the hamburger or other sandwich on which it is served. Since the bacon assembly is bonded together at the welded sections it will not have the tendency to inadvertently fall off of the sandwich.

The bacon assemblies of the present invention also provide substantial advantages to the seller of the product and sandwiches. The bacon assemblies may be formed such that they are partially or fully cooked by the microwave process. The bacon assembly units may then be packaged such that the seller may easily remove the assembly from a package and heat or finish cooking the assembly, as desired. Since the assembly is bound together at the microwave welded sections to form a single unit, the specific configurations of the bacon assembly will be retained. The seller may easily unpackage the assemblies from their respective packages and handle the bacon assemblies without fear that they will come apart. Further, since the bacon is arranged in a predetermined arrangement, the seller may easily place the bacon assembly on the top of the sandwich to be sold without the need to arrange each strip of bacon individually. Therefore, a substantial amount of time may be saved by the seller of the sandwiches by using the bacon assemblies of the present invention.

Thus, the bacon assembly and method of making the bacon assembly provide an arrangement in which conventional slices of bacon may be used to produce an assembled configuration which may be arranged in various arrangements to cover a substantial portion of the surface area of a hamburger patty or other sandwich. With these arrangements, the consumer may easily view the bacon and see that it is formed from conventional slices of bacon, without the need to remove the top bread portion of his sandwich. The bacon assembly also provides the consumer with a bite of bacon for substantially every bite of the sandwich which he is consuming. Since the strips of bacon in the bacon assembly are welded together they will not easily fall off from the sandwich and thus, may be easily arranged on a sandwich by the seller of the sandwiches. Various configurations for the individual strips of bacon may be used to suit the particular use of the seller.

The foregoing description of the preferred embodiments of the present invention has been presented for purposes of illustration and description. They are not intended to be exhaustive or to limit the invention to be precise forms disclosed, and obviously many modifications and variations are possible in light of the above teachings. The embodiments were chosen and described in order to best explain the principals of the invention and its practicable applications to thereby enable others skilled in the art to best utilize the invention in various embodiments and with various modifications as are suited to be particularly used as contemplated. It is intended that the scope of the invention be defined by the following claims, including all equivalents.

We claim:
1. A bacon assembly comprising:
a plurality of bacon strips arranged on a single plane such that each of said bacon strips overlaps at least another one of said bacon strips at an overlapping section, said bacon strips further arranged such that at an overlapping section of two of said plurality of bacon strips a lean portion of one of said bacon strips engages a lean portion of the other of said bacon strips, wherein said bacon strips are microwave welded together at said overlapping sections.

2. The bacon assembly of claim 1 wherein said bacon assembly includes two bacon strips.

3. The bacon assembly of claim 2 wherein said bacon strips are substantially parallel to each other and shingled.

4. The bacon assembly of claim 2 wherein said bacon strips are orthoganal to each other.

5. The bacon assembly of claim 1 wherein said bacon assembly includes three bacon strips.

6. The bacon assembly of claim 5 wherein said bacon strips are arranged substantially parallel to each other and shingled.

7. The bacon assembly of claim 5 wherein said strips are arranged to form a triangular shaped assembly.

8. The bacon assembly of claim 5 wherein two of said strips of bacon are arranged substantially parallel to each other and the third of said strips overlaps said two substantially parallel strips.

9. The bacon assembly of claim 1 wherein said bacon assembly includes four bacon strips.

10. The bacon assembly of claim 9 wherein said strips are substantially parallel to each other and shingled.

11. The bacon assembly of claim 9 wherein said strips are arranged such that said a first pair of said bacon strips are arranged parallel to each other in a first direction and the second pair of said four bacon strips are arranged parallel to each other in a second direction orthoganal to said first direction and overlap said first pair of bacon strips.

12. The bacon assembly of claim 9 wherein said strips are arranged such that three of said bacon strips are substantially parallel to each other and the fourth one of said bacon strips overlaps said three substantially parallel bacon strips.

13. The bacon assembly of claim 1 wherein said bacon strips are arranged such that said three of said bacon strips are arranged parallel to each other in a first direction and the other two of said five bacon strips are arranged parallel to each other in a second direction and overlap said three parallel bacon strips.

14. A method of forming a bacon assembly comprising the steps of:
    arranging a plurality of bacon strips on a single plane in a predetermined arrangement such that each of said bacon strips overlaps at least another one of said bacon strips at an overlapping section and such that at an overlapping section of two of said plurality of bacon strips a lean portion of one of said bacon strips engages a lean portion of the other of said bacon strips; and
    at least partially cooking said bacon strips in said arrangement by subjecting said arranged bacon strips to microwave radiation, such that said bacon strips are microwave welded at said overlapping sections.

15. The method of claim 14 wherein said step of arranging said bacon strips comprises the steps of horizontally slicing a slab of bacon to form a first slice of bacon, positioning said first slice of bacon on a revolving conveyor in a preselected position. horizontally slicing a slab of bacon to form a second slice of bacon, positioning said second slice of bacon on said conveyor in second preselected position, and timing the placing of said second slice of bacon such that said second slice of bacon overlaps said first slice of bacon at a predetermined overlapping section.

16. The method of claim 14 wherein said step of cooking said bacon strips comprises cooking said bacon strips to approximately 40% of the green weight of said bacon strips.

17. The method of claim 15 wherein the step of timing the placing of said bacon strips comprises moving a section of said conveyor belt to a first predetermined location; at said first predetermined location, placing said first strip of bacon on said section of said conveyor belt: moving said section of said conveyor belt to a second predetermined location; at said second predetermined location, placing said second strip of bacon on said section of said conveyor belt.

18. A method of forming a bacon assembly formed of a plurality of bacon strips said bacon assembly intended to be handled by an individual without becoming disassembled and used as an assembly unit comprising the steps of:
    arranging a plurality of bacon strips on a single plane in a predetermined arrangement such that each of said bacon strips overlaps at least another one of said bacon strips at an overlapping section and such that, at an overlapping section of two of said plurality of bacon strips, a lean portion of one of said bacon strips engages a lean portion of the other of said bacon strips; and
    at least partially cooking said bacon strips in said arrangement by subjecting said arranged bacon strips to microwave radiation, such that said bacon strips are microwave welded at said overlapping sections, said bacon strips being arranged to overlap a sufficient amount of lean portion at an overlapping portion and cooked sufficiently such that said bacon assembly will resist being disassembled upon being handled by an individual.

19. The method of claim 14 wherein the steps of at least partially cooking said bacon strips comprises cooking said bacon strips to an internal temperature of at least 140° F.

20. The method of claim 14 wherein the step of at least partially cooking said bacon strips comprises cooking said bacon strips to between 35% to 40% of their original precooked weight.

* * * * *